MACHINE FOR MOUNTING AN INSERT IN THE APERTURE IN A RECORD CARD

Filed March 14, 1963 4 Sheets-Sheet 1

STANLEY T. STOOTHOFF
WILLIAM W. STOOTHOFF
INVENTORS
BY R. Frank Smith
Lloyd F. Seebach
ATTORNEY & AGENT

MACHINE FOR MOUNTING AN INSERT IN THE APERTURE IN A RECORD CARD

Filed March 14, 1963 4 Sheets-Sheet 2

STANLEY T. STOOTHOFF
WILLIAM W. STOOTHOFF
INVENTORS

BY R. Frank Smith
Lloyd F. Seebach
ATTORNEY & AGENT

MACHINE FOR MOUNTING AN INSERT IN THE APERTURE IN A RECORD CARD

Filed March 14, 1963 4 Sheets-Sheet 3

STANLEY T. STOOTHOFF
WILLIAM W. STOOTHOFF
INVENTORS

BY R. Frank Smith
Lloyd F. Seebach
ATTORNEY & AGENT

STANLEY T. STOOTHOFF
WILLIAM W. STOOTHOFF
INVENTORS
BY R. Frank Smith
Lloyd F. Seebach
ATTORNEY & AGENT United States Patent Office 3,359,150

Patented Dec. 19, 1967

3,359,150

MACHINE FOR MOUNTING AN INSERT IN THE APERTURE IN A RECORD CARD

Stanley T. Stoothoff, Glen Rock, and William W. Stoothoff, Ramsey, N.J., assignors to Eastman Kodak Company, Rochester, N.Y., a corporation of New Jersey Filed Mar. 14, 1963, Ser. No. 265,094
30 Claims. (Cl. 156—379)

The present invention relates to a machine for mounting a piece of photographic film in the aperture of a record card, and more particularly to a machine in which a selected portion of a larger strip of film is first registered with respect to a reference mark on a screen and then moved to a position in which the film piece that is to be mounted is cut from the film strip and moved into engagement with an adhesive material overlying the aperture in the card.

It is well known in the prior art to use prepared record cards having an aperture and a frame of adhesive material which overlies and extends into the aperture and against which a piece of photographic film can be secured for retention within the card aperture. Machines that are disclosed in the prior art for mounting a piece of film in such record cards are concerned with first removing a cover sheet from within the card aperture and then aligning a selection portion of the strip of film with the card aperture and with a hollow punch which severs the piece of film from the film strip and moves it into the card aperture. Such a mounting device is shown in U.S. Patent 2,493,159.

The prior art also discloses machines in which a perforated strip of film is viewed in one position for the purpose of verification and then moved to another position in which the viewed area is cut from the film strip and mounted against an adhesive material in a record card aperture. Such a machine is disclosed in U.S. Patent 2,555,-218. In this latter patent, the film strip per se is reciprocated between the two stations for mounting each area or piece of film. The problem of registry is reduced to a minimum because of the positional control that can be exercised due to the film perforations. When a film without perforations is used, reciprocative motion of the film introduces many problems with respect to registration and makes such movement of the film impractical.

In the present invention, the machine described hereinafter is provided with two stations which are spaced from one another and spaced in such relation that the film strip need only be moved in one direction, that is, from the first station in which the area of film that is to be mounted in the card aperture can be viewed, to the second station in which this same film area is cut from the film strip and mounted in the card aperture in contact with the adhesive surface of the material overlying the aperture and extending thereinto.

An object of the invention is, therefore, to provide a machine which will permit visual verification of at least a part of the film area that is to be mounted and quickly affix this same area of film within the aperture of a card and against an adhesive material within the card aperture.

A further object of the invention is to provide a machine having a viewing station and a mounting station in which a cycle of operation will automatically provide for moving the film into the mounting station and accomplishing the necessary cutting and mounting operations.

Still another object of the invention is to provide a machine for visual verification of a length of film and mounting the same length of film in a card aperture wherein the cycle of operation is completely automatic and vacuum operated.

Further objects and advantages of the invention will be apparent to those skilled in the art when the following description is read in conjunction with the disclosure in the drawings.

Reference is now made to the accompanying drawings wherein like numerals designate like parts and wherein.

Figure 1:
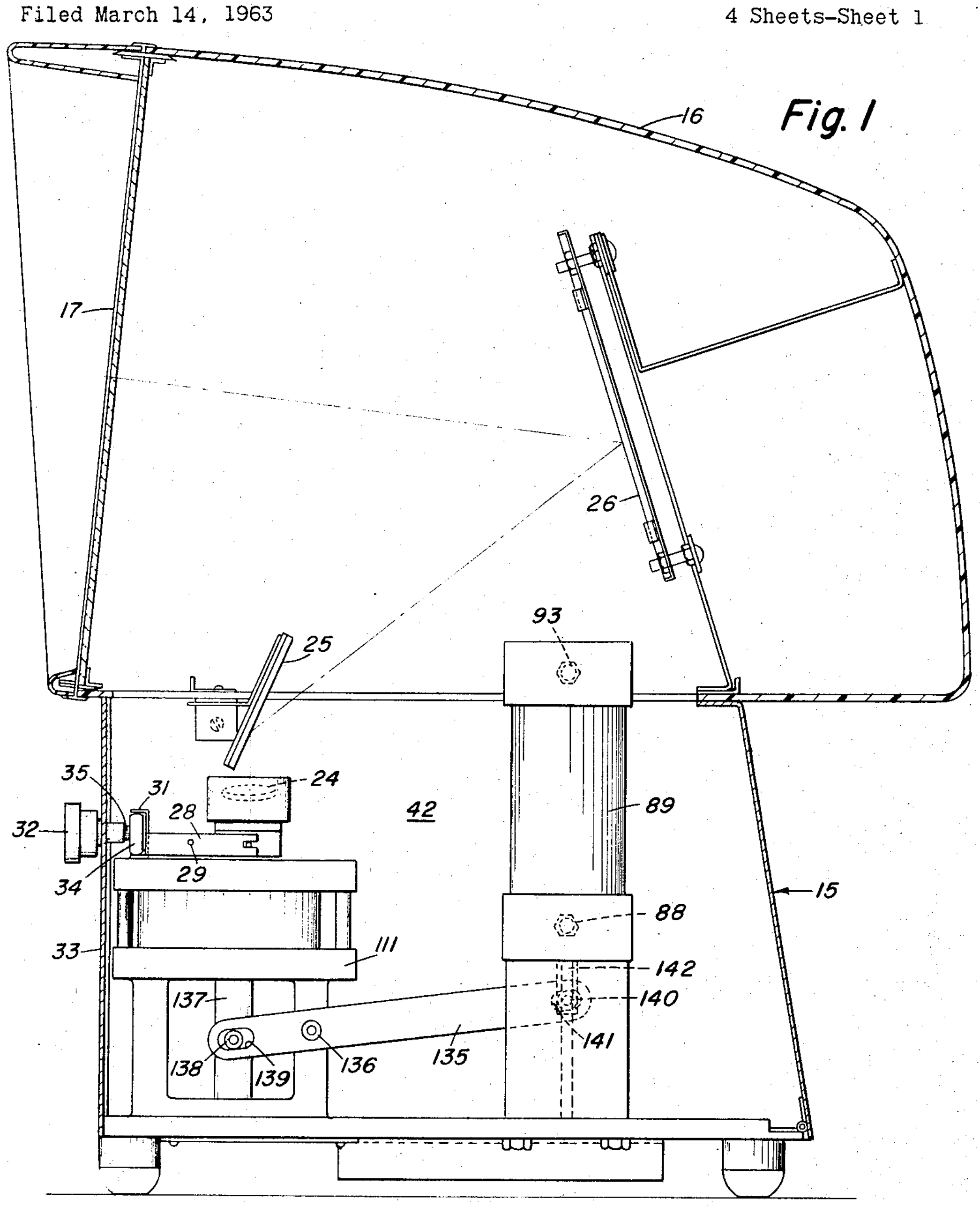
FIG. 1 is a vertical section through the machine showing the relation of various elements as well as the optical projection system.
Figure 1A:
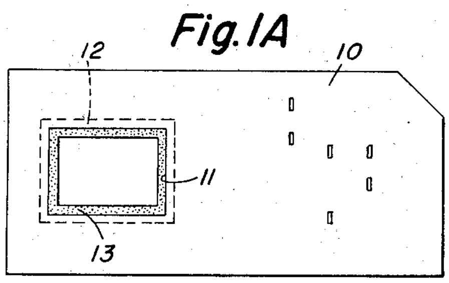
FIG. 1A is a plan view of a record card of a type that can be used in conjunction with the invention.

With reference particularly to FIG. 1A, the machine to be described hereinafter is used to mount a piece of film in a record card 10, which can be a card of any size and shape, but particularly of a type known as an IBM card in which an aperture 11 is provided in a predetermined location or position in the card. A frame 12, which is applied to one surface of the card and a portion of which overlies the card aperture, can be formed of a thin material having a pressure-sensitive adhesive material applied to one side thereof. An adhesive portion 13 of the frame extends into the card aperture and is secured to the length of film that is positioned in the aperture and securely holds it therein to permit the card to be used in the usual card handling operations known to those skilled in the art.

The machine disclosed in FIG. 1 comprises a base portion 15 and a hood 16 having a screen 17 mounted at the front end thereof in a well-known manner, and within which the optical system and operating mechanisms are arranged.

A first station 20 (FIGS. 3 and 4) of the machine comprises an optical system including a lamp 21, a pair of condenser lens elements 22 and 23, a projection lens system 24 and a pair of mirrors 25 and 26 for projecting an image of at least a portion of a predetermined length of strip 27 in the first station onto said screen. The film strip 27 is movable within the focal plane of the projection lens system 24 in a manner to be described. For the purpose of focusing, the projection lens system 24 is movable axially by means of a U-shaped arm 28 which is pivotally mounted at 29 on an optics supporting bracket 30 and carries a channel member 31 at the free end thereof as shown in FIG. 1. A shaft 35 rotatably mounts a focusing knob 32 on a front plate 33 of the base 15. An eccentric 34 is carried on the inner end of shaft 35 for engaging the channel member 31. Upon rotation of knob 32 in either direction, the projections lens system 24 can be moved axially, by means of eccentric 34 and arm 28, to obtain a sharp image on the screen 17.

Figure 2:
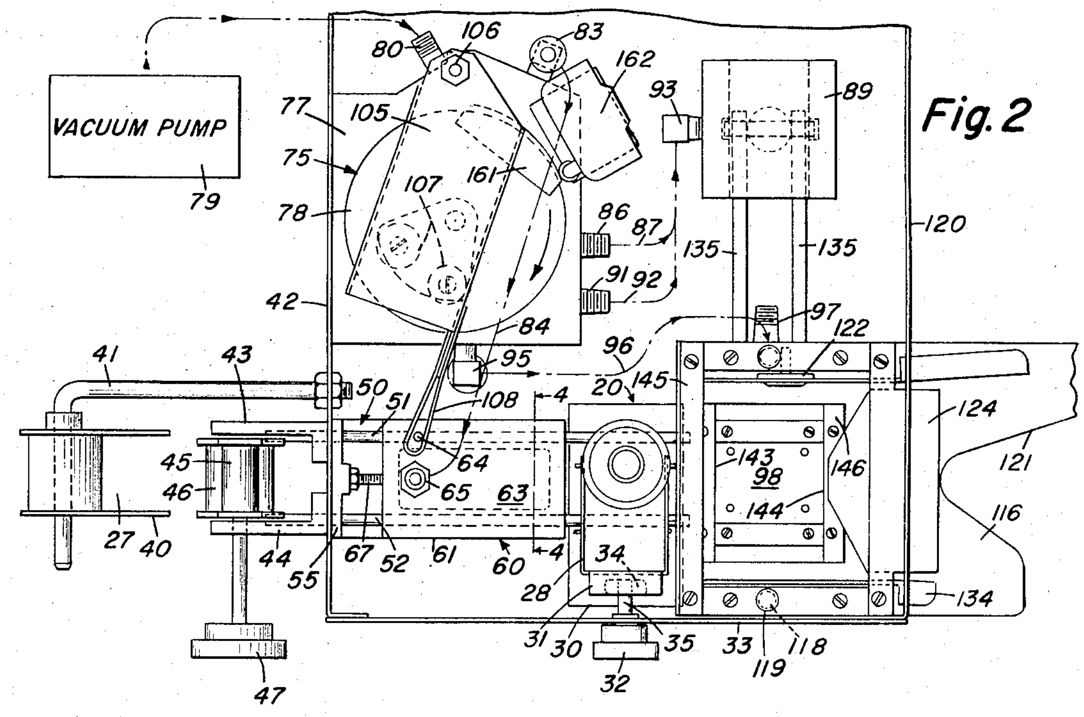
FIG. 2 is a plan view of the mechanisms for advancing the film strip, cutting and mounting the length of film and controlling the automatic operation of said mechanisms.

The film strip 27 is carried by a reel 40, which is mounted on an arm 41 secured to a side plate 42 of the base 15, as shown in FIG. 2. A pair of brackets 43 and 44 are mounted on the side plate 42 and provide bearings for a pair of drive rolls 45 and 46, which are recessed so that only the marginal edges of the film strip are engaged by the rolls. The lower roll 46 is rotatable by means of a knob 47, and with the rolls in frictional contact with film strip 27, rotation of knob 47 moves the film strip toward the first station 20 and can be used to accurately register the length of film in that station in a manner to be described.

Figure 3:
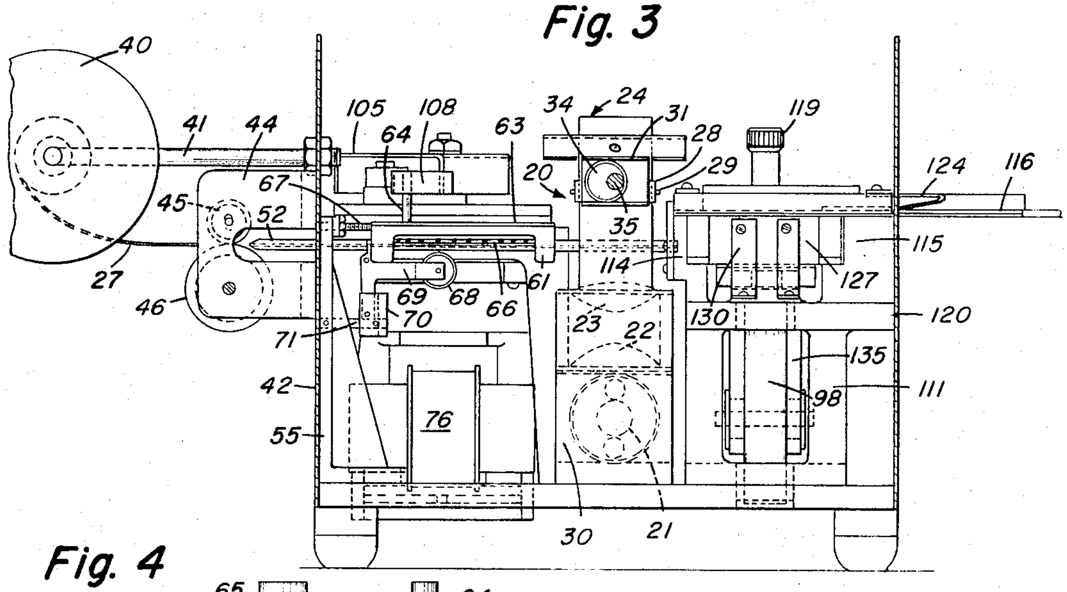
FIG. 3 is a front elevation showing the relation of the elements in FIG. 2 to the film path.

A first means 50 for guiding the film strip into the first station and along the focal plane of the optical system comprises two spaced rods 51 and 52 which are provided with longitudinal slots 53 and 54, respectively, for engaging the edges of the film strip. The rods are supported at one end by a bracket 55 and at the other end by an extension 114 of a bracket 111, as shown in FIGS. 2 and 3.

Figure 4:
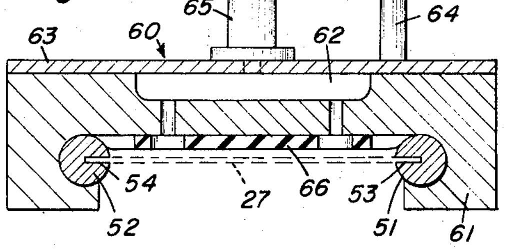
FIG. 4 is an enlarged sectional view taken on line 4—4 of FIG. 2 showing the film advancing means.

A reciprocating means 60 comprises a shuttle member 61 which is slidably mounted on the rods 51 and 52 (see FIG. 4). Member 61 is provided with a recess 62 which is covered by a plate 63 carrying an actuating pin 64 and a vacuum connector 65. The portion of member 61 immediately below the recess 62 carries a plate 66 of soft material, such as neoprene. Plate 66 and the wall adjacent recess 62 are perforated, as shown in FIG. 4, to provide for the film strip being drawn against plate 66 by vacuum applied to connector 65 in a manner to be described hereinafter. The leftward movement of shuttle member 61 (as viewed in FIGS. 3 and 4) is limited by means of an adjustable stop screw 67. A roller 68 is rotatably mounted on an arm 69 which is carried by a bracket 70, the bracket being movable along a pair of spaced pins 71 for adjusting the position of roller 68 below and along the path of movement of the film strip for restricting any curl in the film which would tend to withdraw the film from the slots in the rods 51 and 52 (see FIG. 3). Also, by proper adjustment of roller 68, the film strip is maintained in such position relative to the plate 66 that the vacuum, when applied, pulls and holds the film against shuttle member 61 for movement to the right, as viewed in FIGS. 2 and 3.

A control means 75 (FIGS. 2 and 7) for sequentially applying the vacuum to the various operating elements comprises a motor 76, a fixed member 77 that is arranged over said motor and provided at the top thereof with a number of ports that can be connected to the various elements, and a control member 78 mounted on member 77 and rotatable by the motor, the purpose of the control means being described in more detail hereinafter.

Figure 7:
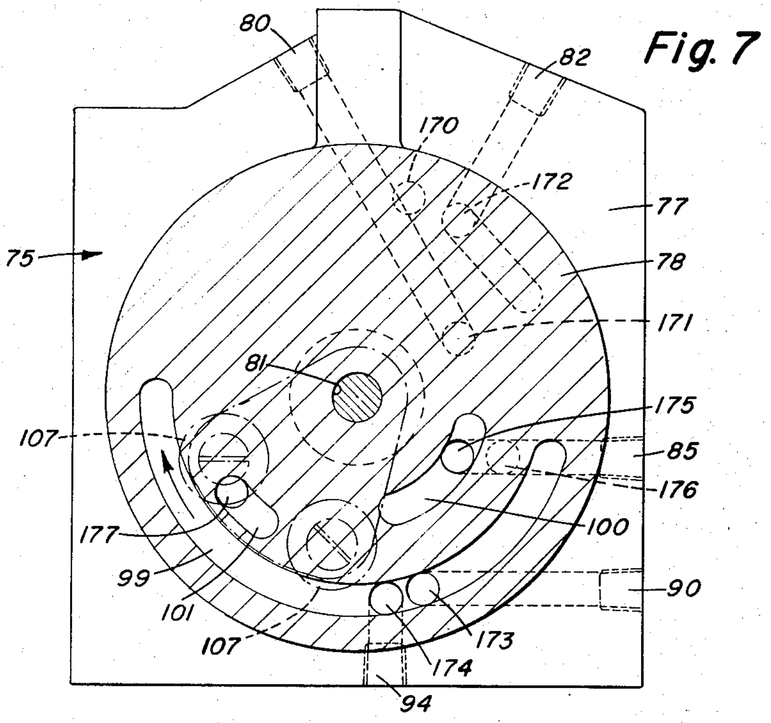
FIG. 7 is an enlarged detail plan view of the rotary valve for controlling sequential application of the vacuum to the various operating parts.

A vacuum source generally indicated by the numeral 79 (FIG. 2) is connected to a port 80 of member 77, the member 77 also provides a bearing for a motor shaft 81, which is connected to the control member 78, the members 77 and 78 forming, in effect, a rotary valve for the application of vacuum to the operating elements. The fixed member 77 is provided with a port 82 and a connector 83 that is connected by a hose 84 to the connector 65 on shuttle member 61; by a port 85 (FIG. 7), a connector 86 (FIG. 2) and a hose 87 to a connector 88 (FIG. 1) on a vacuum actuated piston 89; by a port 90 (FIG. 7), a connector 91 (FIG. 2), and a hose 92 to a connector 93 on the piston 89; and by a port 94 (FIG. 7), a connector 95 (FIG. 2) and a hose 96 to a connector 97 on an applicator 98. As shown in FIG. 7, the various ports cooperate with a series of slots 99, 100 and 101 in the rotatable member 78.

The shuttle member 61 (FIGS. 2 and 3) is driven with a reciprocative motion by means of a U-shaped member 105 pivotally mounted at 106 on member 77 and in engagement with a pair of rollers 107 eccentrically mounted on member 78. Member 105 is interconnected to shuttle member 61 by means of a spring arm 108 which engages pin 64, as shown in FIG. 2. As member 78 is rotated in a clockwise direction by motor 76, the eccentric rollers on member 78 engage member 105 and by means of the spring arm 108, move shuttle member 61 to the right and then return it to its initial position against the stop screw 67. The movement of shuttle member 61 to the right, as viewed in FIGS. 2 and 3, is limited by the bracket extension 114, whereas its movement to the left is limited by the stop screw 67 which can be adjusted to insure the exact length of the film strip that is to be advanced. In order to insure advancement of such exact length of film, rolls 107 are positioned on member 78 so as to provide a slight amount of overtravel of member 105 which is absorbed by spring arm 108 as shuttle member 61 is positively urged against extension 114 and stop screw 67 at each end of its travel.

With application of the vacuum to the shuttle member, as described hereinafter, the film strip 27 is moved with shuttle member 61 and such movement is equivalent to the length of film to be placed or positioned in the card aperture. As a result, the spacing of the first station 20 (in which the film is viewed) relative to a second station 110 (in which the film is cut and mounted in the card aperture) must be equivalent to this movement of shuttle member 61.

Figure 5:
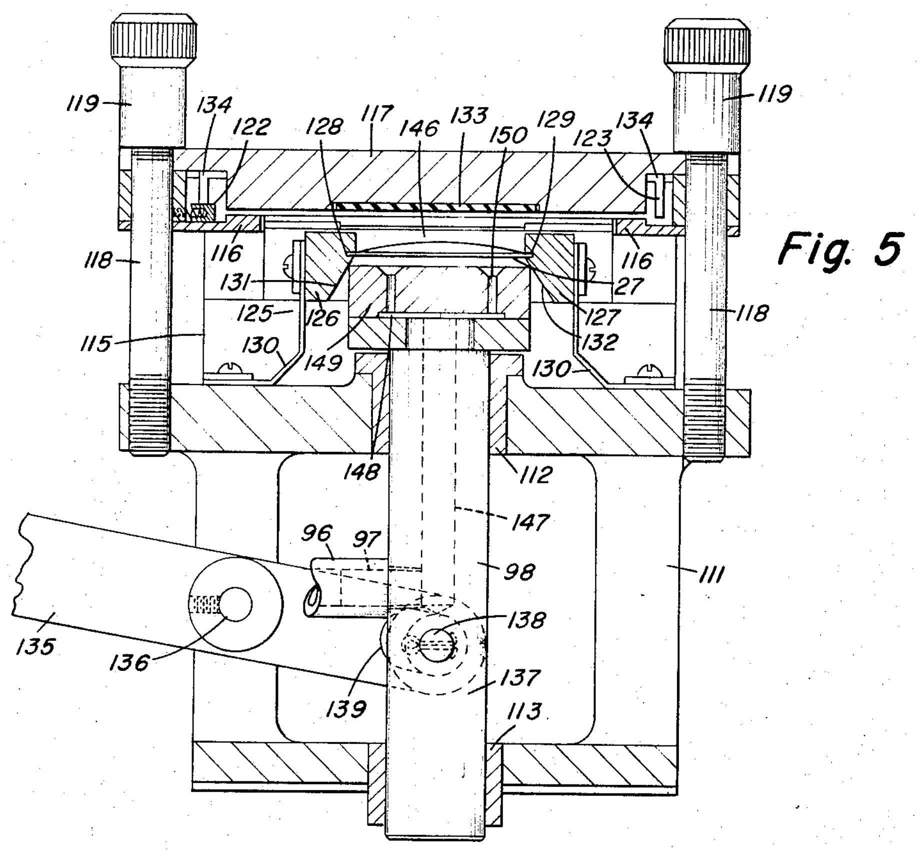
FIG. 5 is a vertical section through the second or mounting station showing the relation of the film strip to the card in which the length of film is to be mounted.
Figure 6:
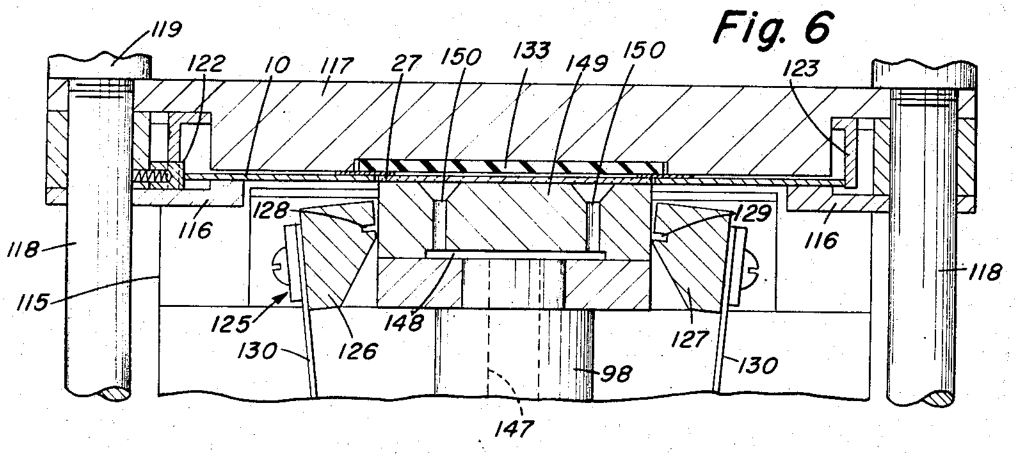
FIG. 6 is an enlarged vertical section of a portion of FIG. 5 showing the relation of the film guide means to the film strip upon cutting the length of film and mounting it in the card aperture.

The second station 110 has means for supporting the film strip relative to a cutting element and for supporting the card 10 with the aperture therein aligned with the cutting element. With particular reference to FIGS. 5 and 6, the previously mentioned bracket 111 is mounted on the base 15 and provides a pair of bearings 112 and 113 for guiding applicator 98 in a reciprocative movement. Bracket 111 is provided with side extensions 114 and 115 for supporting a plate 116 in spaced relation to the applicator 98 in its lowermost position. A backup plate 117 is secured in spaced relation to plate 116 by studs 118 and thumb screws 119. A rubber pad 133 is carried by plate 117 in a position where it is aligned with applicator 98. The space formed between plates 116 and 117, as seen in FIG. 5, provides a means for locating the card 10 in proper relation to the applicator 98. As seen in FIG. 2, the plate 116 extends beyond a side plate 120 and is provided with a notch 121 to permit the card 10 to be easily grasped for insertion into and withdrawal from the space between plates 116 and 117.

At one side of plates 116 and 117 a resiliently mounted shoe 122 (FIGS. 5 and 6) is positioned for engaging the edge of the card and urging it against an extension 123 of an auxiliary side plate 134. A leaf spring 124 (FIGS. 2 and 3) mounted on bracket 111 serves to hold card 10 against plate 116.

A second means 125 for guiding the film strip 27 on movement thereof into the second station 110 comprises two shoes 126 and 127 (FIG. 5) arranged on opposite sides of applicator 98 and having a pair of slots 128 and 129 that are aligned with the slots 53 and 54 in the first guide means 50 (FIG. 2). Each of shoes 126 and 127 (FIG. 5) is secured to the end of a respective leaf spring 130, which is secured to the bracket 111. As the applicator 98 is moved in an upward direction, the outer and upper edges thereof engage a pair of cam surfaces 131 and 132 on the shoes to urge the shoes away from the film prior to cutting thereof and during movement of the severed length of film in an upward direction by the applicator.

The means for actuating the applicator 98 comprises the vacuum-operated piston 89 and two spaced links 135 (FIGS. 1 and 5) that are pivotally mounted intermediate their ends at 136 on the bracket 111. Links 135 are pivotally connected to a stem 137 of the applicator 98 by means of a pin or stud 138 carried by the stem and engaging slots 139 in the links. At the other end of each link 135 a similar stud 140 anad slot 141 connection is made with an extending portion 142 of the piston 89. It can be readily appreciated that as the links are moved in a clockwise direction by the piston 89, the applicator 98 is moved upwardly and first engages the shoes 126 and 127 to disengage them from the film strip. As these shoes are disengaged, the film strip is moved against two spaced cutting edges 143 and 144 on a pair of members 145 and 146 which are arranged transversely of the film path, and as these edges cooperate with the corresponding edges of the applicator 98, a length of film corresponding to the separation of members 145 and 146 is severed from the film strip and moved vertically upward and against the exposed adhesive frame in the card aperture. At the time that the length of film is severed from the strip, a vacuum is applied to the applicator 98 to hold the film thereagainst during its upward movement toward the card. For application of such vacuum, the applicator connector 97 intersects a central blind hole 147 which terminates at a recess 148 in a top plate 149 of the applicator. The plate 149 is provided with a number of holes 150 which lead from the top surface of the plate to the recess 148.

Figure 8:
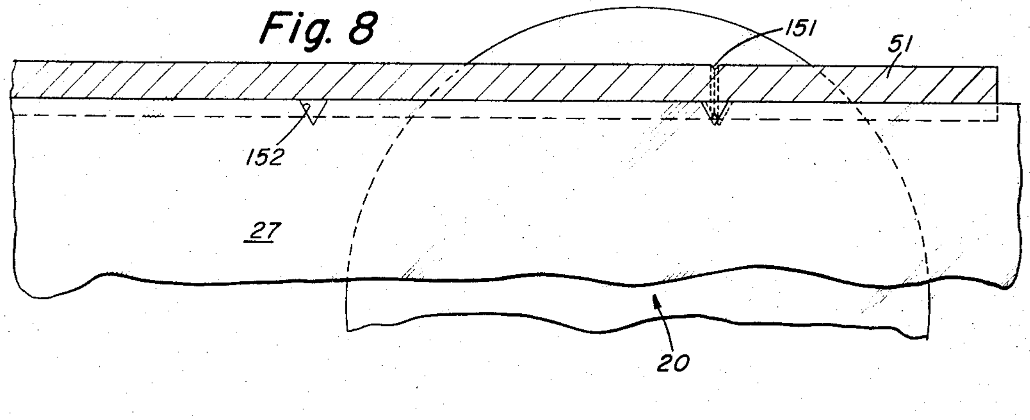
FIG. 8 is a detail plan view showing the reference indicium on the film guide means in the first station and the reference mark located on the film strip on each length of film.

The automatic control for a cycle of operation, which includes alignment of the length of film in the first station 20 and cutting and mounting of the length of film in the second station 110, can be best described with respect to a station-by-station description of the operation of the different elements. A reel of film is first placed on the arm 41 and the end thereof is then moved into the bite of drive rolls 45 and 46. By means of knob 47, the rolls 45 and 46 are rotated and frictionally engage the film strip at the edges thereof for moving it into the slots 53 and 54 and beneath shuttle member 61 to the first station 20 wherein the film strip is located in the focal plane of the projection lens system 24. Rotation of knob 32 moves the projection lens axially to obtain a sharp image on the screen 17. When the film strip is in this position, the operator is then ready to make a visual comparison or verification of the image projected onto the screen with that of the corresponding document or the card to be positioned in the second station 110. Due to the fact that the relative positions of stations 20 and 110 must be such that equivalent lengths of the film strip are advanced with each cycle of operation, the projection system can be such as to project only a portion of the full image of the length of film. For this reason, it is necessary that the length of film be accurately aligned in the first station. To accomplish this, the rod 51 is provided with an annular V-shaped recess 151 as shown in FIG. 8, the profile image of which is projected onto the screen 17 and appears in a corner thereof as a notch. This projected image of the recess 151 provides a reference indicium on the screen against which the length of film can be accurately positioned. Accordingly, each length of film is identified with either a notch 152 as shown in FIG. 8 or a suitable transverse line, preferably inward from the leading edge of the length of film. An image of the notch or line is then projected onto the screen and registered with the image of notch 152. Once this registration has been accomplished by means of knob 47 and rollers 45 and 46, the length of film can then be moved into the second station 110 for cutting and mounting.

Figure 9:
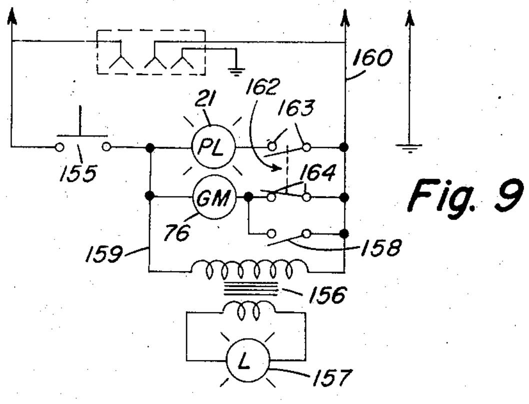
FIG. 9 is a schematic wiring diagram of the circuit for initiating operation of the machine.

With reference to FIG. 9, a switch 155 must first be closed in order to connect a source of potential to the projection lamp 21, the motor 76 and a transformer 156. A lamp 157 is energized with the closing of switch 155 to indicate that power is available for operation of the machine. A cam plate 161 on the member 78 actuates a switch 162 having a set of normally open contacts 163 in series circuit with lamp 21 and a set of normally closed contacts 164 in series circuit with motor 76. However, cam plate 161 holds contacts 163 closed and contacts 164 open until a cycle of operation is commenced with the actuation of switch 158. As a result, when switch 155 is closed, lamp 21 is energized to permit alignment and verification of the projected image by the operator, but motor 76 is not energized. When switch 158 is closed momentarily by the operator, a circuit is completed across a pair of leads 159 and 160 to energize the motor 76 and rotate member 78. Cam plate 161 then permits contacts 163 to open, thereby de-energizing lamp 21 and contacts 164 to close to hold motor 76 energized.

With reference to FIG. 7, the vacuum source 79 maintains a continuous vacuum at the port 80. As member 78 turns in a clockwise direction, the leading end of recess 99 first aligns itself with a vertical hole 170 intersecting the extension of port 80, which in turn, intersects a vertical hole 171. At this time, the vacuum is connected only to the recess 99 and has not yet been applied to any other element. Further movement of the member 78 positions the recess 99 over a hole 172 connected to the port 82. When this occurs, the vacuum is applied via hole 170, recess 99 and hole 172 to the connection between port 82 and the connector 65 on the shuttle member 61. The film 27 is then drawn against the plate 66 and moved to the right by the engagement of rollers 107 with the U-shaped member 105. The length of recess 99 is such that the vacuum is applied to port 82 and shuttle member 61 until it reaches the full limit of its movement to the right, at which time the length of film in the first station 20 has been moved into the second station 110 and accurately aligned with the cutting edges 143 and 144. Continued movement of the member 78 brings the leading edge of the recess 99 into alignment with a hole 173 connected to the port 90. When this occurs, the vacuum is now applied to the connector 93 associated with the piston 89 so as to cause said piston to move in a downward direction, thereby moving the applicator upwardly toward the film strip 27 and card 10. As described hereinabove, when the leading edge of the recess 99 reaches a hole 174, the applicator 98 has disengaged the shoes 126 and 127 from the film strip 27 and the application of the vacuum thereto causes the severed length of film to be held against the plate 149 as it is moved toward the card. As the trailing end of the recess 99 reaches the opening 170, the recess 100 connects the hole 171 to a hole 175 for the port 85. At this instance, the vacuum has been shut off from the shuttle member 61 via port 82, as well as the piston 89 via port 90 and the applicator 98 via port 94. Also at this time, the applicator 98 has moved the severed length of film into the card aperture and against the adhesive frame exposed in the card aperture to secure the length of film thereto. The application of the vacuum to port 85 directs the vacuum to the connector 88 of the piston 89 to move it in the other direction so as to return the applicator to its lowermost position below the path of movement of the film strip. During this interval, the eccentric rollers 107 pivot the U- shaped member 105 in the opposite direction so as to move shuttle member 61 to the left and against the stop screw 67, the film strip 27 remaining stationary. The purpose of the recess 101 is to connect a hole 176 associated with port 85 to the atmosphere previous to application of the vacuum by recess 100 in order to insure that this side of the piston is at atmospheric pressure, the recess 101 being connected to the atmosphere by a hole 177 in member 78. As the member 78 approaches its limit of one revolution, the cam plate 161 engages the switch 162 to open contacts 164 and break the circuit to the motor 76 and to close contacts 163 to energize the projection lamp 21 for verification and comparison of the length of film already positioned in station 20. As a result, once the operator has properly aligned the first length of film with the notch appearing on screen 17, no more than a slight adjustment of the film strip (by means of knob 47) is necessary. Thereafter, the operator need only verify the projected image on screen 17 with the next card, insert the card in the station 110 and then actuate switch 158 to initiate another complete cycle of operation.

While the invention has been described with respect to a machine that is cyclically operated by means of vacuum actuated members, it will be appreciated by those skilled in the art that various other means may be used to provide the same or a similar cycle of operation for viewing, cutting and mounting a length of film in the aperture of a record card. Accordingly, the invention is not to be limited to the embodiment disclosed and described hereinabove but is of a scope as defined by the appended claims.

We claim:

1. In a machine for cutting a predetermined length of film from a film strip and mounting said length of film in a predetermined location on a receiving member, the combination comprising:
   guide means for guiding said film strip along a predetermined path;
   a first station on said path for viewing at least a portion of said length of film;
   a second station on said path spaced from said first station and including means for supporting said receiving member;
   drive means;
   reciprocating means actuated by said drive means for engaging said film strip to advance the latter along said path successively into said first and second stations and for releasing said film strip upon movement of said length of film into said second station; and
   cyclically operable means in said second station actuated by said drive means in timed relation to movement of said length of film into said second station for cutting a length of film from said film strip and moving said length of film into engagement with said receiving member.

2. A machine in accordance with claim 1 including means for producing a vacuum, and means for interconnecting said vacuum to said reciprocating means during movement thereof toward said second station and to said cyclically operable means during cutting and movement of said length of film.

3. A machine in accordance with claim 2 wherein said interconnecting means comprises a rotary valve coupled to said drive means.

4. A machine in accordance with claim 3 wherein said reciprocating means is coupled to said drive means by a pivotal link having a follower in engagement with an eccentric actuating member on said rotary valve.

5. In a machine for cutting a predetermined length of film from a film strip and mounting said length of film in a predetermined location on a receiving member, the combination comprising:
   guide means for guiding said film strip along a predetermined path;
   a first station on said path for viewing at least a portion of said length of film;
   a second station on said path spaced from said first station and including means for supporting said receiving member;
   drive means;
   means for producing a vacuum;
   means coupled to said drive means and connected to said vacuum producing means for controlling the application of said vacuum to provide a cycle of operation;
   reciprocating means actuated by said control means for engaging said film strip to advance the latter successively into said first and second stations, said vacuum being applied to said reciprocating means for releasably engaging said film strip only during movement thereof toward said second station;
   cutter means arranged in said second station and including fixed members arranged in relation to said path and between said path and said receiving member supporting means, and a member arranged on the side of said path opposite said fixed members and movable from an initial position toward said receiving member for sequentially cooperating with said fixed members to sever said film strip and for moving the severed length of film into engagement with said receiving member; said vacuum being applied to said movable member for retaining the severed length of film thereon only from the time said film is severed until it is moved against said receiving member; and
   means coupled to said movable member and responsive to said vacuum for actuating said cutter means in timed relation to movement of said film strip into said second station.

6. A machine in accordance with claim 5 wherein said control means comprises a rotary valve coupled to said drive means and connected to said vacuum producing means, said advancing means, said movable member of said cutting means, and said actuating means.

7. A machine in accordance with claim 5 wherein said control means comprises a fixed member provided with ports connected to said vacuum producing means, said advancing means, said movable member of said cutting means and said actuating means, and a rotatable member coupled to said drive means and having a number of recesses for sequentially interconnecting the port connected to said vacuum producing means to the other ports to provide a cycle of operation.

8. A machine in accordance with claim 7 wherein said rotatable member includes an eccentric portion coupled to said reciprocating means.

9. A machine in accordance with claim 5 and including means responsive to said control means for maintaining said drive means enabled for a cycle of operation and for disabling said drive means to terminate a cycle of operation.

10. A machine in accordance with claim 7 wherein said drive means comprises an electric motor and an electric circuit including said motor, a manually operated switch means for enabling said motor and switch means actuated by said rotary member for maintaining said motor energized and for disabling said motor with each revolution thereof.

11. A machine in accordance with claim 7 and including means actuatable by said rotatable member for disabling said drive means to limit said cycle of operation to a single revolution of said rotatable member.

12. A machine in accordance with claim 5 wherein said actuating means comprises a vacuum actuated piston coupled to said movable member for imparting reciprocative motion thereto.

13. In a machine for cutting a predetermined length of film from a film strip and mounting said length of film in a predetermined location on a card, said card being provided with means on one side thereof and in said predetermined location for retaining said length of film, the combination comprising:
   a first station including an optical system for projecting an image of at least a portion of said length of film onto a screen;
   a second station displaced from said first station and including means for supporting said card;
   first guide means for guiding said film strip into said first station and into the focal plane of said optical system;
   second guide means arranged in said second station in alignment with said first means for releasably engaging and guiding said film strip on movement of the latter into said second station;
   drive means;
   reciprocating means actuated by said drive means for engaging said film strip to advance said length of film from said first station to said second station and for releasing said film strip upon movement of said length of film into said second station; and
   cyclically operable means in said second station actuated by said drive means in timed relation to movement of said length of film into said second station for disengaging said second guide means from said film strip, cutting said length of film from said film strip, and moving said length of film into engagement with the other side of said card.

14. A machine in accordance with claim 13 wherein said second guide means comprises resiliently mounted members arranged on opposite sides of the path of movement of said film strip and in the path of movement of said cyclically operable means.

15. A machine in accordance with claim 13 including means in engagement with said film strip for adjusting the relative position of the length of film in said first station with respect to said optical system independently of said reciprocating means.

16. In a machine for cutting a predetermined length of film from a film strip, each predetermined length of film being identified by a reference indicium, and mounting said length of film within an aperture in a card and in contact with a frame of adhesive material overlying said aperture and secured to one side of said card, the combination comprising:

a first station including an optical system for projecting an image of at least a portion of said length of film onto a screen;

a second station displaced from said first station and including means for supporting said card;

first guide means arranged between a supply reel for said film strip and said second station for guiding movement of said film strip into said first station and into the focal plane of said optical system;

registry means on said first guide means and projectable by said optical system onto said screen for locating said length of film in said first station with respect thereto;

manually operable means engaging said film strip between said supply reel and said first guide means for moving said film strip into said first station and for registering said reference indicium identifying said length of film in said first station with said registry means;

second guide means in said second station arranged adjacent the other side of said card and in alignment with said first guide means for releasably engaging and guiding said film strip on movement of the latter into said second station;

drive means;

means for producing a vacuum;

a rotary valve including a fixed member having a plurality of ports, one of which is connected to said vacuum producing means, and a movable member having an actuating portion and being coupled to said drive means for controlling the sequential application of said vacuum at said one port to said other ports to provide a cycle of operation;

a first reciprocative means arranged on said first guide means and between said manually operable means and said first station and coupled to said actuating portion for advancing the length of film in said first station into said second station, said reciprocative means having a portion thereof adjacent said film strip connected to one of said other ports for releasably engaging said film strip only during movement thereof toward said second station;

applicator means arranged in said second station and including two cutter blades fixed in spaced relation transversely of the film strip path and between said path and said card supporting means, and an applicator member arranged on the side of said second guide means opposite said two blades and movable toward said card for sequentially disengaging said second guide means from said film strip, cooperating with said two blades to sever said film strip, and moving the severed length of film into said aperture and against said frame, said applicator member being connected to another of said ports whereby said vacuum retains the severed length of film thereon from the time said film strip is severed until it is moved against said frame; and a second reciprocative means coupled to said applicator member and having each side thereof connected to others of said ports for actuating said applicator member in timed relation to movement of said film strip into said second station.

17. A machine in accordance with claim 16 wherein said second guide means comprises resiliently mounted members arranged on opposite sides of the film strip and in the path of movement of said applicator member whereby said resiliently mounted members are disengaged from said film strip prior to the cutting thereof.

18. A machine in accordance with claim 16 and including means actuatable by the movable member of said rotary valve for disabling said drive means to limit said cycle of operation to a single revolution of said movable member.

19. A machine in accordance with claim 16 wherein said drive means comprises an electric motor and an electric circuit including said motor, a manually operated switch means for enabling said motor and switch means actuated by the movable member of said rotary valve with each revolution thereof for disabling said motor.

20. A machine in accordance with claim 16 wherein said second reciprocative means comprises a vacuum actuated piston coupled to said applicator member for imparting motion thereto.

21. In an apparatus for intermittently feeding a film strip along a predetermined path, a device for successively advancing predetermined lengths of said film strip past a preselected point on said path comprising:

means for guiding said film strip along said path;

means arranged on said guiding means and movable toward and away from said preselected point for advancing said film strip;

drive means;

means for producing a vacuum; and control means including:

(a) conduit means operatively connecting said vacuum to said advancing means; and (b) movable valve means disposed in said conduit means and connected to said drive means and to said advancing means for intermittently applying said vacuum to, and for moving said advancing means.

22. A device in accordance with claim 21 wherein said guiding means comprises a pair of spaced rods provided with facing longitudinal slots for engaging the marginal edges of said film strip, and said advancing means comprises a member slidably mounted on said rods and having a perforated surface thereof in close proximity to said film strip.

23. A device in accordance with claim 21 wherein said valve means comprises a fixed member having a first port connected to said vacuum producing means and a second port connected to said advancing means, a member rotatably mounted on said fixed member and coupled to said drive means, said rotatable member being provided with an external eccentric and with an internal recess so as to interconnect said first port to said second port to apply the vacuum to said advancing means and holding said film strip thereagainst during movement of the latter toward said point, and an actuating member pivotally mounted on said fixed member and coupled to said eccentric and to said advancing means so as to impart reciprocative movement to said advancing means.

24. A device in accordance with claim 23 wherein said actuating means is coupled to said advancing means by a resilient member to permit overtravel of said actuating member with respect to said advancing means.

25. In an apparatus for intermittently feeding a film strip along a predetermined path, a device for successively advancing predetermined lengths of said film strip past a preselected point on said path, comprising:

a pair of spaced rods provided with facing longitudinal slots for engaging the marginal edges of said film strip to guide it through said plane;

a vacuum platen slidably mounted on said rod at one side of said preselected point and having a perforated surface in close proximity to said film strip, said vacuum platen being movable toward said point for advancing said film strip;

drive means;

means for producing a vacuum;

a fixed member;

a member rotatably mounted on said fixed member and coupled to said drive means, said member having an external eccentric and being provided with an internal recess for interconnecting said first port to said second port to hold said film strip against said vacuum platen during movement thereof toward said plane; and an actuating member pivotally mounted on said fixed member, coupled to said eccentric, and resiliently coupled to said vacuum platen for imparting reciprocative movement to the latter, said resilient coupling permitting overtravel of said actuating member relative to said vacuum platen at each end of the latter's movement.

26. In a device for cutting a predetermined length of film from a film strip and mounting said length of film within an aperture in a card and in contact with a frame of adhesive material overlying said aperture and secured to one side of said card, the combination comprising:

means for supporting said card;

guide means arranged adjacent the other side of said card for releasably engaging the marginal edges of said film strip;

cutter means including two members fixed in spaced relation transversely of said film strip and between said film strip and said card supporting means, and a vacuum platen member arranged on the side of said guide means opposite said film strip and movable toward said card for sequentially releasing said guide means from said film strip, cooperating with said fixed members to sever said film strip, and moving the severed length of film into said aperture and against said frame;

drive means;

means for producing a vacuum;

actuating means responsive to said vacuum and coupled to said vacuum platen member; and means coupled to said drive means and connected to said vacuum producing means, to said vacuum platen member and to said actuating means for controlling the sequentially application of said vacuum to said vacuum platen member and said actuating means during a cycle of operation.

27. A device in accordance with claim 26 wherein said guide means comprises resiliently mounted members arranged on opposite sides of said film strip and in the path of movement of said vacuum platen member whereby said resiliently mounted members are disengaged from said film strip prior to the cutting thereof.

28. A device in accordance with claim 26 wherein said control means comprises a rotary valve connected to said vacuum producing means and coupled to said drive means and rotatable thereby for sequentially connecting said vaccum to said actuating means for moving said vacuum platen member toward said card, to said vacuum platen member for holding the severed length of film thereon during the interval it is moved from the plane of the film strip into the card aperture, and to said actuating means for moving said vacuum platen member away from said card.

29. A device in accordance with claim 28 wherein said rotary valve comprises a fixed member having a first port and a second port connected to said vacuum producing means, a third port connected to said actuating means for moving said platen member toward said card, a fourth port connected to said vacuum platen member for holding the severed length of film thereon, and a fifth port connected to said actuating means for moving said vacuum platen member away from said card, and a control member coupled to said drive means and rotatable thereby, said control member having a first recess for sequentially connecting said first port to said third port and to said fourth port and said second port to said fifth port.

30. A device in accordance with claim 28 wherein said drive means comprises an electric motor and an electric circuit including said motor, a manually operated switch means for enabling said motor and switch means actuatable by said rotary valve with each revolution thereof for disabling said motor.

References Cited

UNITED STATES PATENTS

| | | | |
|---|---|---|---|
| 2,651,429 | 9/1953 | Von Hofe | 156—572 |
| 2,717,710 | 9/1955 | Baker et al. | 156—108 |
| 3,163,570 | 12/1964 | Brundage | 156—108 |

DOUGLAS J. DRUMMOND, *Primary Examiner.*

UNITED STATES PATENT OFFICE

CERTIFICATE OF CORRECTION

Patent No. 3,359,150 December 19, 1967

Stanley T. Stoothoff et al.

It is hereby certified that error appears in the above numbered patent requiring correction and that the said Letters Patent should read as corrected below.

Column 10, line 59, for "holding" read -- hold --; column 11, line 8, after "member" insert -- having a first port connected to said vacuum producing means and a second port connected to said vacuum platen; --.

Signed and sealed this 18th day of March 1969.

(SEAL)
Attest:

Edward M. Fletcher, Jr.
Attesting Officer

EDWARD J. BRENNER
Commissioner of Patents